(12) United States Patent
Holenstein et al.

(10) Patent No.: US 12,271,508 B1
(45) Date of Patent: Apr. 8, 2025

(54) METHOD AND SYSTEM FOR PROCESSING A DOCUMENT AND VALIDATING DATA INTEGRITY AND RELIABILITY OF DOCUMENT PROCESSING RESULTS

(71) Applicant: Gravic, Inc., Malvern, PA (US)

(72) Inventors: Bruce D. Holenstein, Media, PA (US); Dylan R. Holenstein, Media, PA (US); Owen C. Davison, Honey Brook, PA (US); Victor F. Berutti, Glenmoore, PA (US); Paul J. Holenstein, Downingtown, PA (US)

(73) Assignee: GRAVIC, INC., Malvern, PA (US)

( * ) Notice: Subject to any disclaimer, the term of this patent is extended or adjusted under 35 U.S.C. 154(b) by 0 days.

(21) Appl. No.: 18/090,774

(22) Filed: Dec. 29, 2022

Related U.S. Application Data

(60) Provisional application No. 63/295,247, filed on Dec. 30, 2021.

(51) Int. Cl.
*G06F 21/64* (2013.01)
*G06F 16/23* (2019.01)
*G06F 21/60* (2013.01)

(52) U.S. Cl.
CPC .......... *G06F 21/64* (2013.01); *G06F 16/2379* (2019.01); *G06F 21/602* (2013.01)

(58) Field of Classification Search
CPC ..... G06F 21/64; G06F 16/2379; G06F 21/602
See application file for complete search history.

(56) References Cited

U.S. PATENT DOCUMENTS

| | | | |
|---|---|---|---|
| 6,122,630 | A | 9/2000 | Strickler et al. |
| 6,662,196 | B2 | 12/2003 | Holenstein et al. |

(Continued)

OTHER PUBLICATIONS

Bill Highleyman et al. "Breaking the Availability Barrier: Survivable Systems for Enterprise Computing." AuthorHouse, 2004, Chapter 7: "The Ultimate Architecture," 20 pages.

(Continued)

*Primary Examiner* — Allen S Lin
(74) *Attorney, Agent, or Firm* — Clark A. Jablon

(57) ABSTRACT

A method and apparatus are provided for processing a document and validating data integrity and reliability of document processing results. The document includes one or more data collection areas which are located in and are part of the document and which are configured to receive input by a person who enters information in the one or more data collection areas, and a unique identifier which is located in and is part of the document. In operation, a document is received at the document distributor which distributes an electronic representation of the document to each of two or more document processing systems, each of which has an associated database. Processing of the document is initiated in each of the two or more document processing systems by reading the unique identifier of the document, interpreting any inputted information in the one or more data collection areas, and updating the associated database for each of the two or more document processing systems with document processing results including the read unique identifier of the document, and any interpreted inputted information. A hash value is computed in each of the two or more document processing systems, for each of the document processing results. A validation engine matches the computed hash values. The validation engine validates data integrity and reliability of the document processing results when the computed hash values match. The processing of the document in the database of each of the two or more document processing systems is then finalized when the data integrity and reliability of the document processing results has been validated. In one embodiment, the document is an election ballot.

36 Claims, 15 Drawing Sheets

(56) References Cited

U.S. PATENT DOCUMENTS

| | | | | |
|---|---|---|---|---|
| 6,792,547 | B1* | 9/2004 | Murata | H04N 1/32101 |
| | | | | 213/200 |
| 6,971,574 | B1* | 12/2005 | Herskowitz | G06Q 50/26 |
| | | | | 235/386 |
| 10,152,506 | B1 | 12/2018 | Hoffmann et al. | |
| 10,467,223 | B1 | 11/2019 | Holenstein et al. | |
| 2016/0191509 | A1* | 6/2016 | Bestler | H04L 63/0876 |
| | | | | 713/193 |
| 2017/0155790 | A1* | 6/2017 | Tanaka | G06F 40/169 |
| 2022/0078008 | A1* | 3/2022 | Kong | H04L 9/3297 |
| 2022/0198864 | A1* | 6/2022 | Ge | G06Q 50/265 |

OTHER PUBLICATIONS

Bruce Holenstein et al. "Breaking the Availability Barrier II: Achieving Century Uptimes with Active/Active Systems." AuthorHouse, 2007, Chapter 3: "An Active/Active Primer" and Chapter 4: "Active/Active Topologies," 116 pages.

* cited by examiner

METHOD AND SYSTEM FOR PROCESSING A DOCUMENT AND VALIDATING DATA INTEGRITY AND RELIABILITY OF DOCUMENT PROCESSING RESULTS

CROSS-REFERENCE TO RELATED APPLICATIONS

This application claims priority to U.S. Provisional Patent Application No. 63/295,247 filed Dec. 30, 2021, which is incorporated by reference herein.

BACKGROUND OF THE INVENTION

Certain terms used in the following sections are defined in Section 3, "Definitions."

1 Background

1.1 Introduction

Forms processing is a mission-critical activity for many applications for example, in the processing of election results. As of the early 2020's, a large percentage of citizens in many countries no longer fully trust the election process for state and federal offices. This distrust can be attributed to the perceived or actual lack of integrity and validation of election results. A general trend is a move from direct recording equipment (DRE) back to paper ballots. Paper ballots are more tangible and auditable yet still possess some of the same challenges for validation if processed by automated equipment.

Extended beyond election balloting, there is a general wariness of forms processing of all types, for example, proxies, lotteries, tax returns, and other types of processing, suffer from numerous reports of hackers, system mis-configurations, hardware flaws, operator fraud, and related problems. This has caused the loss of faith in the processing results and the loss of millions to billions of US dollars in direct and consequential damages.

1.2 RAS: Three Pillars of Mission Critical Computing

The three pillars of mission critical computing are Reliability, Availability, and Scalability (RAS). Their relationship is often depicted on the vertices of an equilateral triangle since they have equal, critical importance. To define the three pillars of RAS more thoroughly:
  i. Reliability is a measure of how well a system returns the same correct, consistent, and uncorrupted results each time, and relies on the underlying integrity of the database, application, and system components;
  ii. Availability is the percent of uptime achieved by the application in servicing users; and
  iii. Scalability is the capability to add resources when needed to handle the application load, and to return those resources when no longer needed. On a historical note for the "S" in RAS: IBM originally coined the term Serviceability for their mainframe systems, but Tandem and Compaq used the term Scalability. Herein this specification, the latter term is used.

Well-known architectures used for maximizing availability and scalability are described in Breaking the Availability Barrier: Survivable Systems for Enterprise Computing, AuthorHouse 2004; U.S. Pat. No. 6,122,630 (Strickler et al.); and U.S. Pat. No. 6,662,196 (Holenstein et al.).

High availability and scalability get the vast majority of attention in talks about mission critical systems. In fact, the Gravic, Inc., Malvern, PA USA Shadowbase business continuity suite, globally marketed by Hewlett Packard Enterprise (HPE) as HPE Shadowbase, is promoted for its continuous availability and scalability capabilities via its active/active technology.

Less well-known are architectures, called Validation Architectures, for maximizing reliability and its associated data integrity requirement. These architectures are described in the following sections.

1.3 Reliability: The Elephant in the Room

Reliability is the elephant in the room as many computer companies ignore it and even completely omit it from their literature and talks. Yet, problems with data integrity are prevalent and can arise from software bugs, hardware errors, malware, hacking, and many other problems. For example, problems with CPUs have been in the news a lot recently—Meltdown, Spectre, Rowhammer, and many other variant problems affect hardware. Software is in the same situation with almost daily announcements of major data breaches and hacks.

1.4 Validation Architectures for Data Integrity

Validation Architectures described in U.S. Pat. No. 10,152,506 (Hoffmann et al.) and U.S. Pat. No. 10,467,223 (Holenstein et al.) maximize data integrity and reliability for computer processing systems. For those familiar with early generation HPE NonStop systems, they echo the concepts of lock-step CPUs and the Logical Synchronization Unit, except solve the problem for modern transaction processing systems using hyper-threaded/SMT (simultaneous multi-threaded), non-deterministic CPUs.

Three levels of Validation Architecture are defined for transaction validation. Level 0 is the most basic, and Level 2 is the most advanced. All three levels make use of a Transaction Duplicator that routes the request (User Request or Transaction) to independent processing nodes as shown in FIG. 1.

The transaction duplicator can be custom implemented or use a tool such as NGINX or Apache Camel. On HPE NonStop systems, Apache Camel is called NSMQ.

1.5 Offline Transaction Validation: Level 0 Architecture

Offline Transaction Validation as shown in FIG. 2 uses the transaction duplicator to route the identical copies of a request to two independent nodes running the same application. Periodic (e.g., hourly or daily), database compares are run, for example, by using a Gravic, Inc., Malvern, PA USA Shadowbase product component called Shadowbase Compare to ensure data integrity in the databases.

1.6 Asynchronous Transaction Validation: Level 1 Architecture

Asynchronous Transaction Validation as shown in FIG. 3 operates like Level 0, but for each transaction that is fully processed and committed on the nodes, indicia of the transaction outcome are calculated and exchanged between the processing nodes (or the processing nodes send the indicia to the transaction distributor). If a mismatch between the indicia happens, immediate action can be taken like logging the problem, sending out alerts, and even undoing or reversing the damage caused by the transaction with a tool like Shadowbase UNDO.

1.7 Synchronous Transaction Validation: Level 2 Architecture

Synchronous Transaction Validation as shown in FIG. 4 is a major step beyond Level 1 as the validation processes actually join the applications' transactions as voting members. Similar to Level 1, indicia are computed and exchanged, and the underlying transactions are either committed or aborted, thereby preventing any form of data integrity problems from proceeding and propagating throughout the system.

These three levels of Validation Architectures described above implement Dual Server Reliability (DSR). In some mission critical and life preserving applications, the capability to eject a compromised node and continue processing may be necessary if a problem is detected.

1.8 Triple Server Reliability

Triple Server Reliability (TSR) may be utilized where the majority rules. It would be nearly impossible for a hacker to simultaneously corrupt two or three different systems, especially if the nodes are hosted in different datacenters using different operating systems and application environments. The difference is depicted in FIG. 5.

1.9 Best of Both Worlds Implementation

Note that active/active data replication architecture is ideal for applications needing high availability and scalability, since it provides the best Recovery Time Objective (RTO) and Recovery Point Objective (RPO) rates in the industry. Combined with a Validation Architecture, we can add high data integrity in order to add in the best Integrity Time Objective (ITO) and Integrity Point Objective (IPO) rates, what we call a "best of both worlds" implementation.

As an example, the left three systems shown in FIG. 6 are working together as a Validation Architecture system, and so are the right three systems.

Active/active replication works together with the Validation Architecture to allow transactions to be sent either to the left or right transaction distributors. The result is maximizing all three: Reliability, Availability, and Scalability.

1.10 What is Needed

Mission-critical document processing systems, such as voting systems, often require:
A. Catch unauthorized document form copying,
B. Allow for the rescanning of document forms with no ill results (idempotence),
C. Prevent hackers from invading a processing stream undetected and changing results,
D. Reduce risk from insider attacks,
E. Eliminate the need for secure document transport of physical forms,
F. Detect hackers seeking to change results before they can cause significant damage,
G. Protect against hardware faults, software bugs, and operator errors,
H. Provide business continuity in the event of disasters like power outages and storms,
I. Scale the solution up or down as processing demands dictate.

What is needed are methods and systems that address these requirements in order to validate and ensure the integrity of document forms processing. These methods and systems must utilize architectures that maximize the Reliability, Availability, and Scalability of said document processing systems.

BRIEF SUMMARY OF THE INVENTION

2 Brief Summary

The current invention provides for processing a document and validating data integrity and reliability of document processing results. The main components include a (i) document distributor that serves as a transaction duplicator, (ii) two or more document processing systems with document processors that receive matching user requests from the document distributor, each document processing system having an associated database, and (iii) one or more validation engine(s) exist which serve to ensure the validity, data integrity, and reliability of the document processing results. The documents to be processed include (i) one or more data collection areas for a person who enters information, and (ii) a unique identifier which is located in and is part of the document. The unique identifier may be human readable or in some cases (entirely or partially) unintelligible and non-human readable without the use of special processing algorithms.

Initially, a document is received at the document distributor. It may be received in paper form and rendered into an electronic format by scanning in an optical scanner. The document distributor distributes the electronic representation of the document to each of the two or more document processing systems.

The processing of the document at each of the two or more document processing systems is accomplished by: (i) reading the unique identifier of the document, (ii) interpreting any inputted information in the one or more data collection areas, and (iii) updating the associated database for each of the two or more document processing systems.

A hash value representation of the document processing results is calculated for each document processing system. The hash value calculation may include the results of the data collection area(s) and the unique identifier. The hash value is made available to the validation engine(s).

The validation engine matches the computed hash values generated by the document processing systems. The validation engine then considers that data integrity and reliability of the document processing results are validated when the computed hash values match. "Validation" in this context means that the document processing results are accepted as valid. The processing of the document in each of the two or more document processing systems is finalized when the data integrity and reliability of the document processing results has been validated. The processing of the document in each of the two or more document processing systems is not finalized when the computed hash values do not match.

3 Definitions

The following definitions describe the use of certain terms in this specification. They are hierarchically ordered in that each definition builds on previous definitions.

Data Manipulation Language (DML)—The steps or operations (events) that control a database's contents, such as insert, update, delete, and read a row or record.

Data Definition Language (DDL)—The steps or operations (events) that control a database's structure, such as add or delete a column or a table.

Database Management System (DBMS)—A system that manages a database by controlling the structure of the database and by executing commands against the database, such as inserting data into files or tables.

Change Log—a record of all (or important) changes made to a database. A transaction log or audit trail is an example of a change log.

Application—One or more processes cooperating to perform a useful function or service.

Operating System—A software facility that manages computer hardware resources and provides common services for application processes. Typical services include time functions, reading and writing inter-process (IPC) messages, alerts, signals, and database manipulation.

Transaction—a database transaction is a delimited set of database steps or operations (inserts, updates, deletes, reads) that are either all made or none are made (ACID properties). A database transaction is guaranteed to leave the database in a persistent, consistent, and correct state; and its results are typically guaranteed to survive system failures. In contrast, a user request may be considered a user transaction to be processed and may result in one or more database transactions as the request is processed. An example user request might be to transfer funds from checking to savings. This would result in a database transaction that consisted of a Begin directive, a debit to the checking account, a credit to the savings account and a Commit directive. In the present invention, a user request could consist of processing a batch of 100 form images. The processing of the 100 form images may result in multiple database transactions.

ACID Properties—Database transactions maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed. 5 Atomicity—See ACID Properties.

Begin Transaction—A directive/operation that indicates the beginning of a database transaction.

A begin transaction directive may be explicit, or it may be implicit with the first database operation for a transaction.

Begin Work—Equivalent to Begin Transaction.

Commit Transaction—A database transaction termination directive/operation that indicates that a transaction has successfully completed and should be made durable.

Commit Work/Commit—Equivalent to Commit Transaction.

Abort Transaction/Abort Work/Rollback—A database transaction termination directive/operation that indicates that a transaction is unsuccessful and should be undone, i.e. rolled back, with no effect on the database.

Rollback Work—Equivalent to Abort Transaction/Abort Work.

Transaction Directive or Action—A database transaction command or action such as Begin Transaction, Abort Transaction, or Commit Transaction.

Transaction Manager—A facility for managing the updating of a database by applying database transactions to it. A transaction manager ensures that changes to a database maintain the ACID properties.

BRIEF DESCRIPTION OF DRAWINGS

4 Figure Descriptions

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

5 Detailed Description

Certain terminology is used herein for convenience only and is not to be taken as a limitation on the present invention.

The words "a" and "an", as used in the claims and in the corresponding portions of the specification, mean "at least one."

5.1 Preferred Embodiments Descriptions

Figure 1:
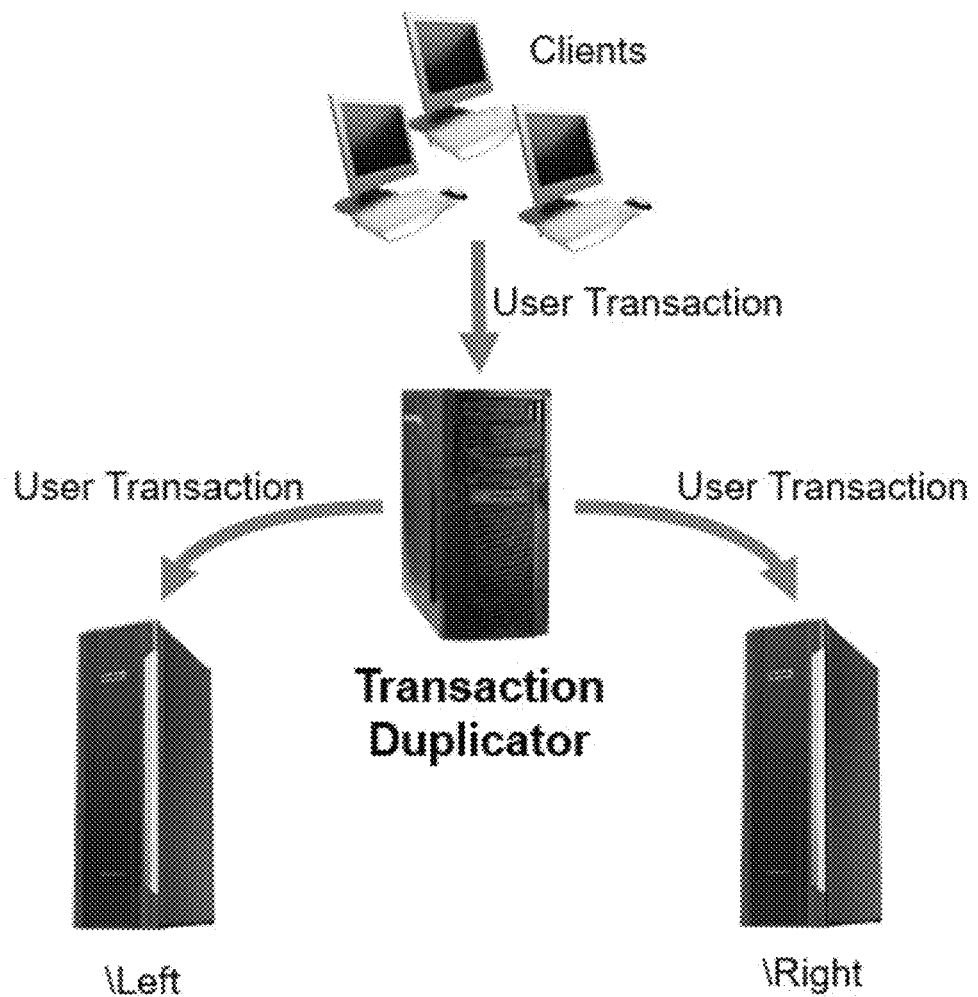
FIG. 1 shows a prior-art system with a Transaction Duplicator.
Figure 2:
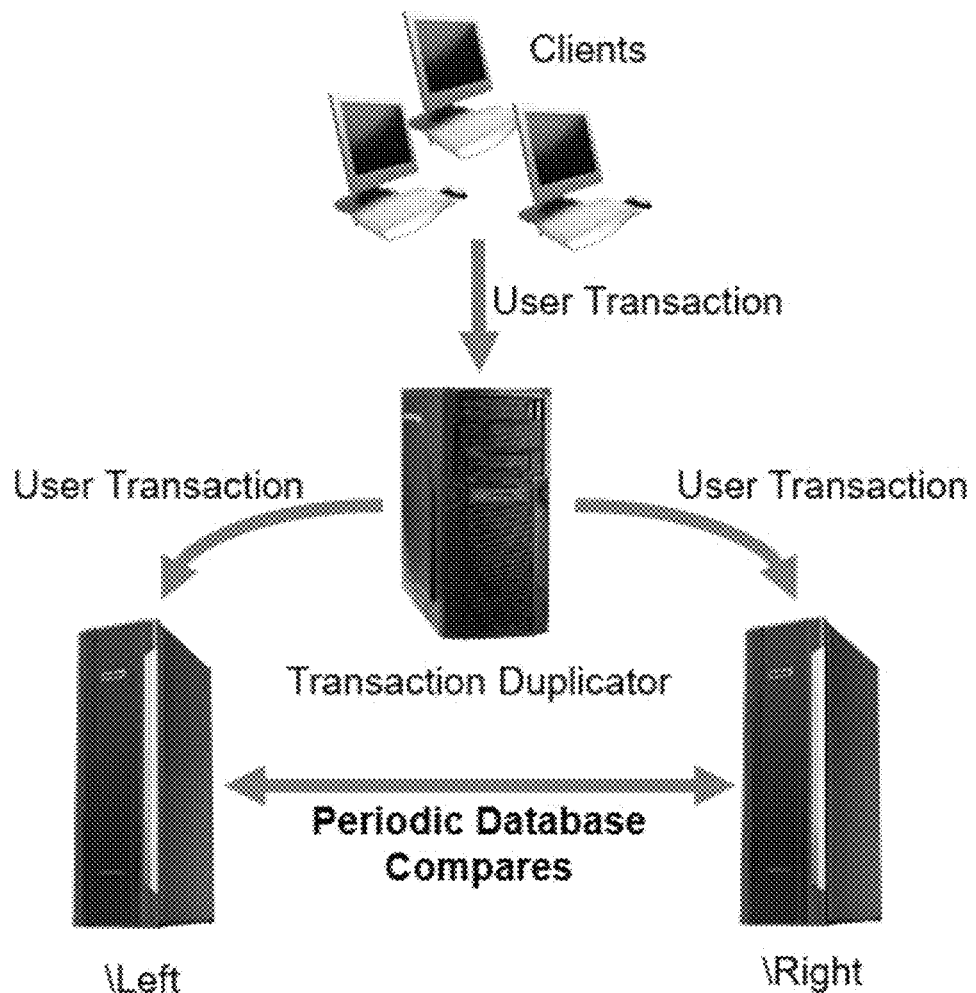
FIG. 2 shows a prior-art Level 0 dual redundant system with offline transaction validation.
Figure 3:
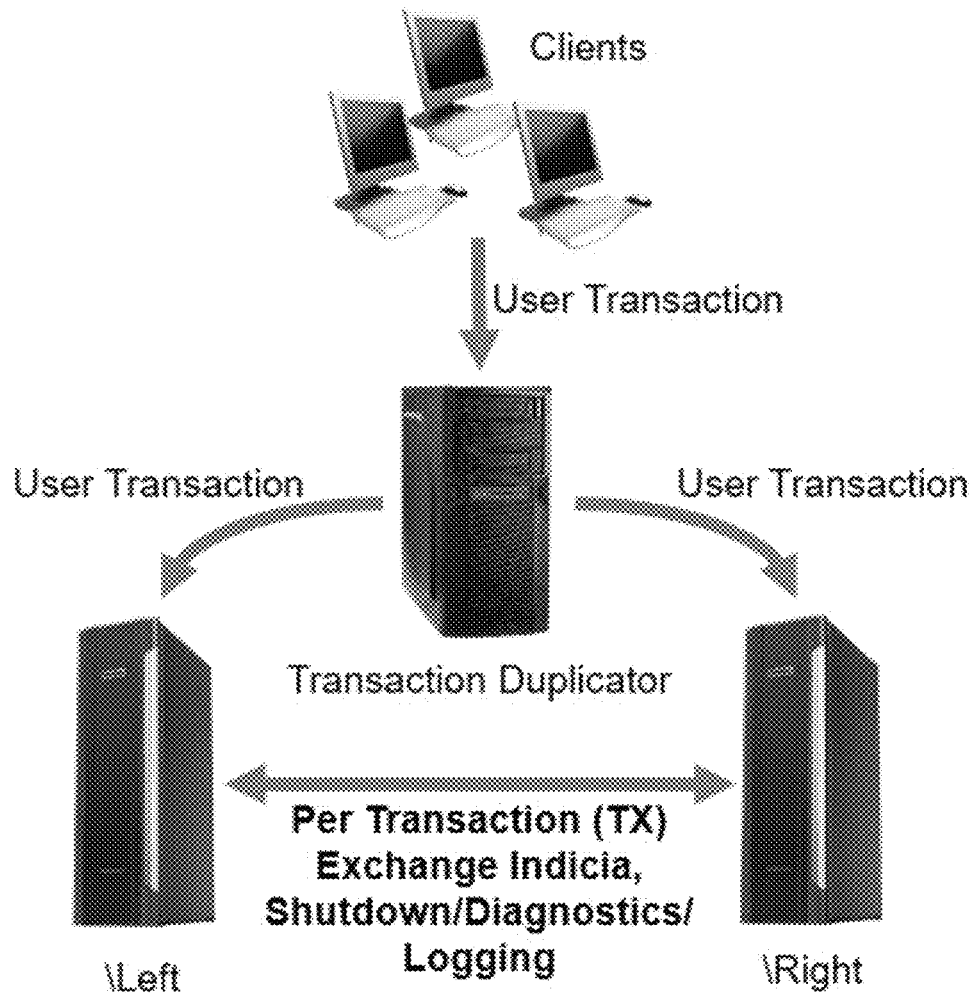
FIG. 3 shows a prior-art Level 1 dual redundant system with asynchronous transaction validation.
Figure 4:
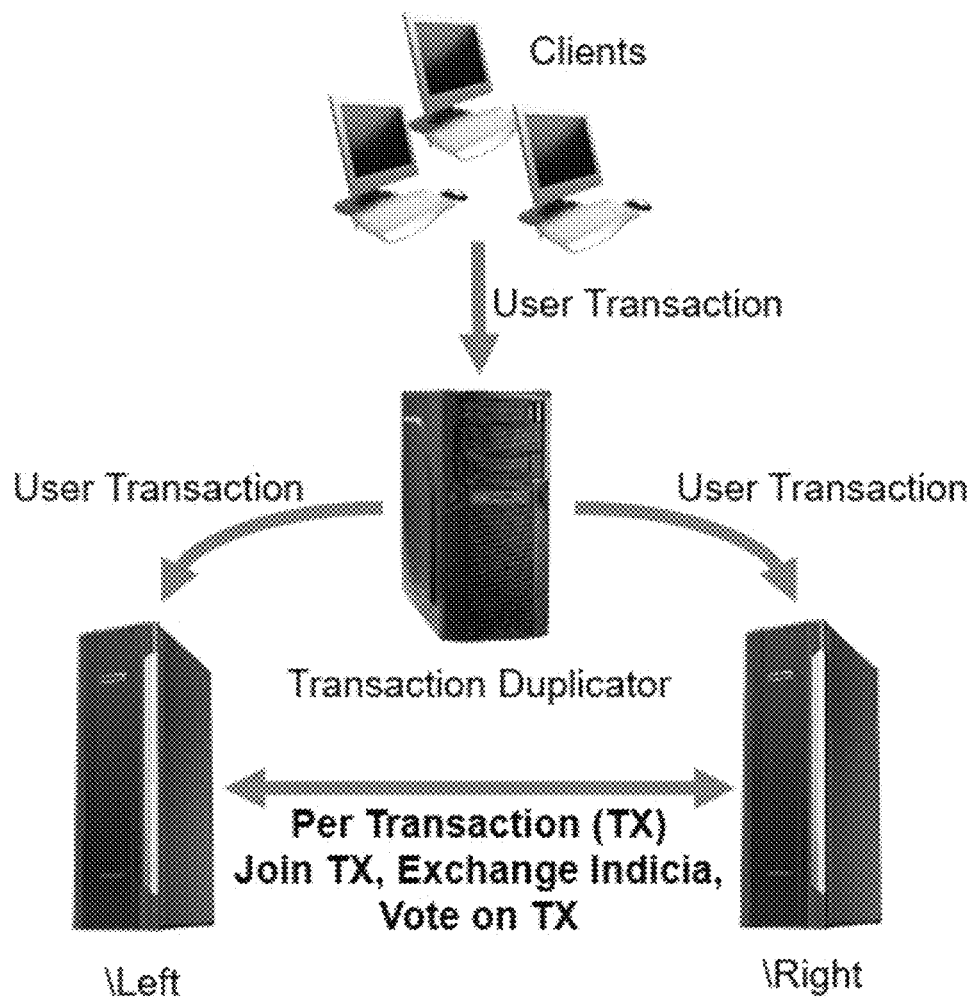
FIG. 4 shows a prior-art Level 2 dual redundant system with synchronous transaction validation.
Figure 5:
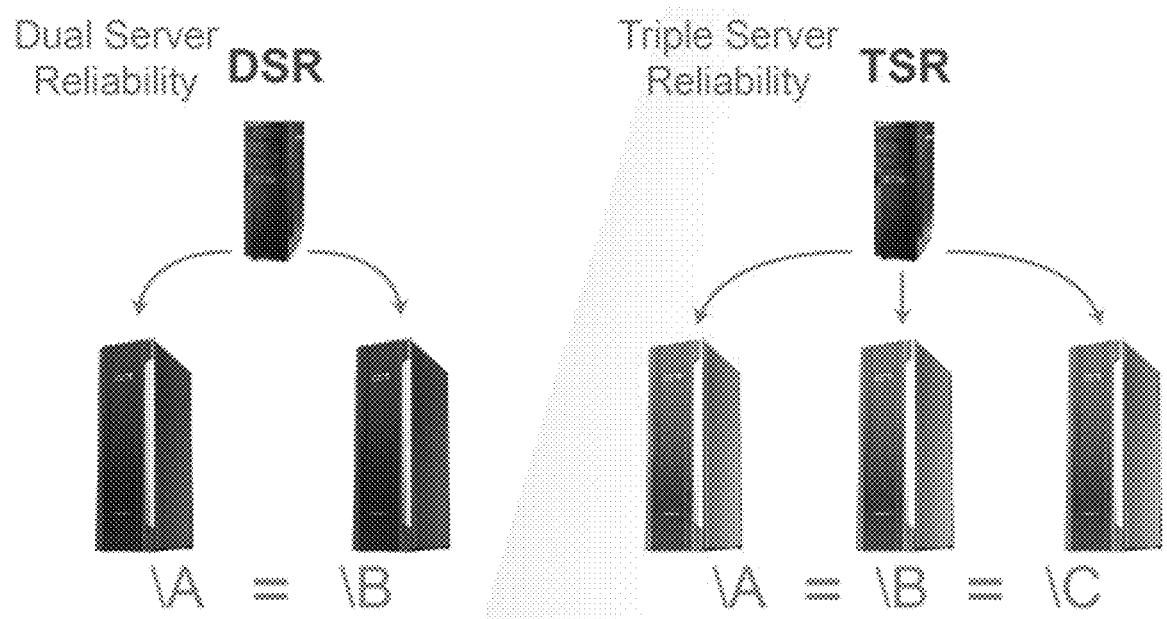
FIG. 5 shows prior-art dual and triple server reliability systems.
Figure 6:
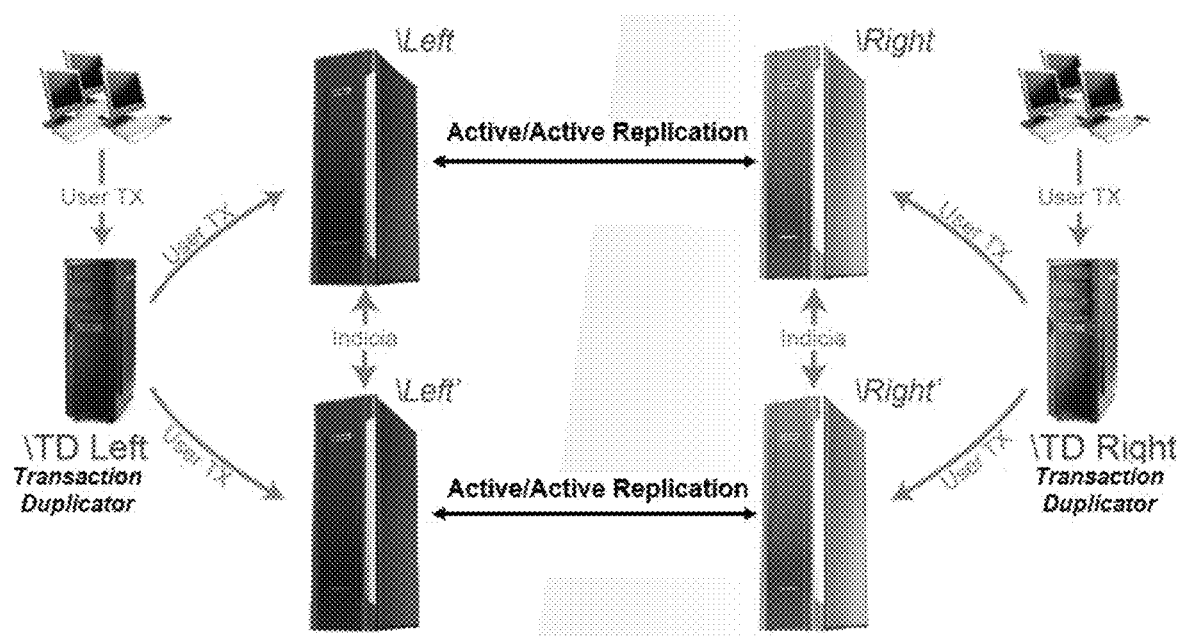
FIG. 6 shows a prior-art system for the "Best of Both Worlds": Active/Active Architecture for availability/scalability and Validation Architecture for data integrity.
Figure 7:
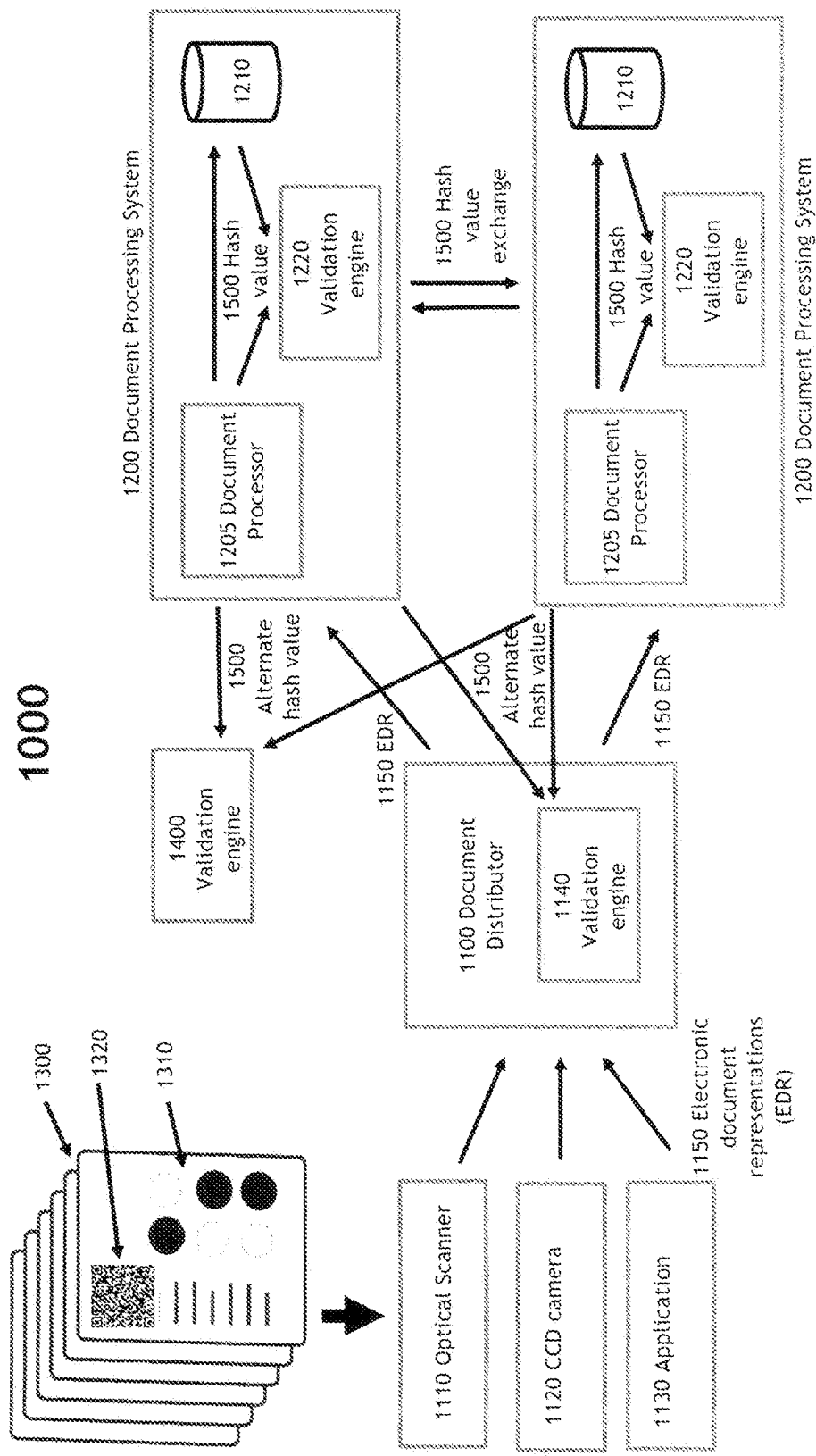
FIG. 7 shows a system architecture for a preferred embodiment of the present invention.

A preferred method of operation of the present invention follows. Shown in FIG. 7 is the system architecture (1000) for processing a document and validating data integrity and reliability of document processing results for the present invention. The components are:

(i) a document distributor (1100) that serves as the transaction distributor discussed in the Background section, the transaction in this case is a user request to process one or more documents;

(ii) two or more document processing systems (1200) with document processors (1205) able to receive matching user requests from the document distributor, each document processing system having an associated database (1210);

(iii) a validation engine which serves the role of ensuring the validity, data integrity, and reliability of the document processing results, said validation engine may reside at one or both document processing systems (1220), or alternately at the document distributor (1140), or an independent system (1400);

(iv) documents to be processed (1300) that include (i) one or more data collection areas (1310) which are located in and are part of the document and which are configured to receive input by a person who enters information in the one or more data collection areas, and (ii) a unique identifier which is located in and is part of the document (1320), the identifier may be human readable or in some cases unintelligible and non-human readable without the use of special processing algorithms.

Initially, a document is received at the document distributor. It may be received in paper form and rendered into an electronic form by scanning in an optical scanner (1110) or a picture from a CCD camera (1120). Alternately, a commercial application (1130) like Adobe PageMaker, or a turnkey application (1130) like a balloting direct marking equipment device could provide an exclusively electronic document.

The document distributor (1100) distributes the electronic representation of the document (EDR) (1150) to each of the two or more document processing systems. If the number of document processing systems is two then the system is configured for Dual Server Reliability, if the number is three then the system is configured for Triple Server Reliability. The document distributor may make groups of multiple documents into a batch that get distributed as a single user request transaction.

The processing of the electronic document representations (EDR's) (1150) at each of the two or more document processing systems (1200) is accomplished by:

(i) reading the unique identifier of the document (1320),
(ii) interpreting any inputted information in the one or more data collection areas (1310), and
(iii) updating the associated database (1210) in each of the two or more document processing systems (1200) with document processing results including (A) the read unique identifier of the document and, (B) any interpreted inputted information.

A hash value representation of the document processing results (1500) is calculated for each document processing system (1200). The hash value may be all or a subset of the database DML operations, a simple checksum, or a Secure Hash Algorithm (SHA) value. The data used in the calculation might be utilized directly from the document processing results or it may be read from the durable change/transaction logs on the systems.

The hash value is made available to the validation engine (1140, 1220 or 1400). This might be accomplished by sending the hash value over a network to the validation engine (1220) residing on one or both document processing systems (1200), the validation engine (1140) residing in the document distributor, or the validation engine (1400) residing in a third independent system. Alternately, some shared resource such as a cluster shared drive might hold the hash values made available to the validation engine.

The validation engine matches the computed hash values (1500) generated by the document processing systems. The validation engine then considers that data integrity and reliability of the document processing results are validated when the computed hash values match. The results are not validated when the computed hash values do not match. "Validation" in this context means that the document processing results are accepted as valid.

The processing of the document in the database of each of the two or more document processing systems is finalized when the data integrity and reliability of the document processing results has been validated. The updating step(s) may be accomplished as part of a database transaction, and so the finalizing step would include committing the database transaction. Alternately, the updating step(s) may be written to a transaction log, and wherein the finalizing includes making the transaction log durable.

If the computed hash values do not match, the processing of the document in the database of each of the two or more document processing systems is not finalized. In this case, if the updating step(s) was accomplished as part of a database transaction, then the finalizing step would include aborting or rolling back (rollback) the database transaction. Alternately, if the updating step(s) was written to a transaction log, then the entries in the transaction log would not be made durable, or would be marked with an indication of the rollback. Additionally, messages or alerts may be issued to inform operators or officials that there is a mismatch to be investigated.

5.1.1 Additional Features of Preferred Embodiments

The database at each of the document processing systems may be prepopulated with the unique identifiers. Prior to finalizing the processing on each database processing system, checking whether or not the unique identifier of the document was prepopulated in each of the document processing systems. And, the document processing system prevents the finalizing of processing of the document in the database of each of the two or more document processing systems when the unique identifier of the document was not prepopulated in each of the document processing systems.

An alternate for processing is that the database at each of the document processing systems includes a table of unique identifiers of documents that have been previously finalized. Prior to finalizing in the document processing systems, checking whether the unique identifier of the document was previously finalized in each of the document processing systems. And, preventing the finalizing of processing of the document in the database of each of the two or more document processing systems when the unique identifier of the document was previously finalized in each of the document processing systems.

The unique identifier which is located in and is part of the document may be added to the document after the receiving step. This means that the unique identifier may not initially be on the physical document or the electronic document, and that it can be added at the document scanning or distribution stage.

For further clarification, the finalizing step may also include:

(i) Delaying the finalization until all or a specified subset of the documents have been processed. A specified subset may consist of a batch of forms, a geographical grouping of forms, or other significant grouping.

(ii) Post processing of queries against the associated database to check business rules have been followed, such as disallowing multiple processing of the same form, or favoring the earliest time stamp.

5.2 Flowchart for a Preferred Embodiment and Alternate Embodiments

Figure 8:
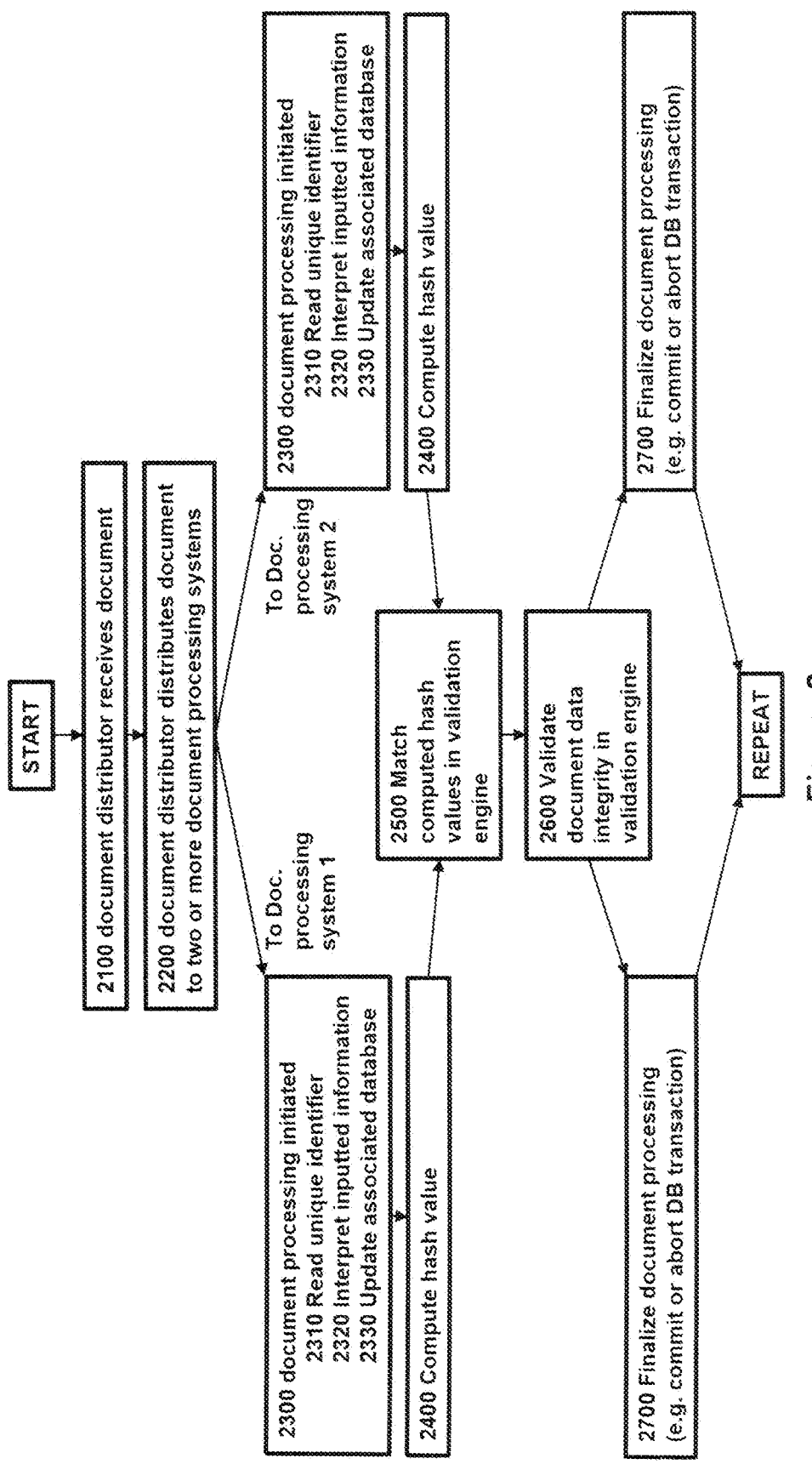
FIG. 8 shows a flowchart for a preferred embodiment of the present invention.

A flowchart for a preferred embodiment is shown in FIG. 8. The steps are as follows:

At Step 2100, the document distributor receives a document from a source such as a CCD camera, an optical scanner, or in electronic form from an application.

At Step 2200, the document distributor distributes an electronic representation of the document to each of the two or more document processing systems.

At Step 2300, document processing is initiated in each of the two or more document processing systems by:

A. At Step 2310, reading the unique identifier of the document,

B. At Step 2320, interpreting any inputted information in the one or more data collection areas, and C. At Step 2330, updating the associated database in each of the two or more document processing systems with document processing results including (A) the read unique identifier of the document and, (B) any interpreted inputted information;

At Step 2400, the hash value for each of the document processing results is computed.

At Step 2500, the computed hash values are matched.

At Step 2600, the validation engine validates the data integrity and reliability of the document processing results when the computed hash values match.

At Step 2700, processing of the document in the database of each of the two or more document processing systems is finalized when the data integrity and reliability of the document processing results has been validated.

As an alternate embodiment, prior to Step 2100, the database at each of the document processing systems is prepopulated with the unique identifier used on the document. And, the Step 2600 validation process includes checking whether the unique identifier of the document was prepopulated in each of the associated databases of the document processing systems; and if not, preventing the Step 2700 finalizing of processing of the document in the database of each of the two or more document processing systems when the unique identifier of the document was not prepopulated in each of the document processing systems.

As an additional embodiment, the database at each of the document processing systems includes a table of unique identifiers of documents that have been previously finalized. The Step 2600 validation process includes checking whether the unique identifier of the document was previously finalized in each of the document processing systems; and preventing the Step 2700 finalizing of processing of the document in the database of each of the two or more document processing systems when the unique identifier of the document was previously finalized in each of the document processing systems.

5.3 Balloting Use Case Proof of Concept (POC) for Election Fraud Prevention

An illustrative implementation of a preferred embodiment of the present invention is now described. The implementation is centered on processing election ballots but may be adapted to processing of most types of forms. Terms used to describe elements in the Detailed Description are quoted inside of parentheses.

As described in the Background section, a method is needed to hold and process elections with transparency and verifiable data integrity. When we say elections, we mean all elections. Government elections can include federal, state, and local ones, such as school board elections. Corporate elections include shareholder and proxy ballots, and union elections include letter carriers, teachers, construction, and manufacturing sectors. Of course, non-profits also hold many types of elections.

The POC solution chosen for this growing problem leverages the Remark Office OMR and Shadowbase database replication technologies, available from Gravic, Inc., Malvern, PA USA, in a Validation Architecture to provide high levels of reliability, availability, and scalability for the implementation.

5.3.1 Sample Ballot with GUID Feature

Figure 9:
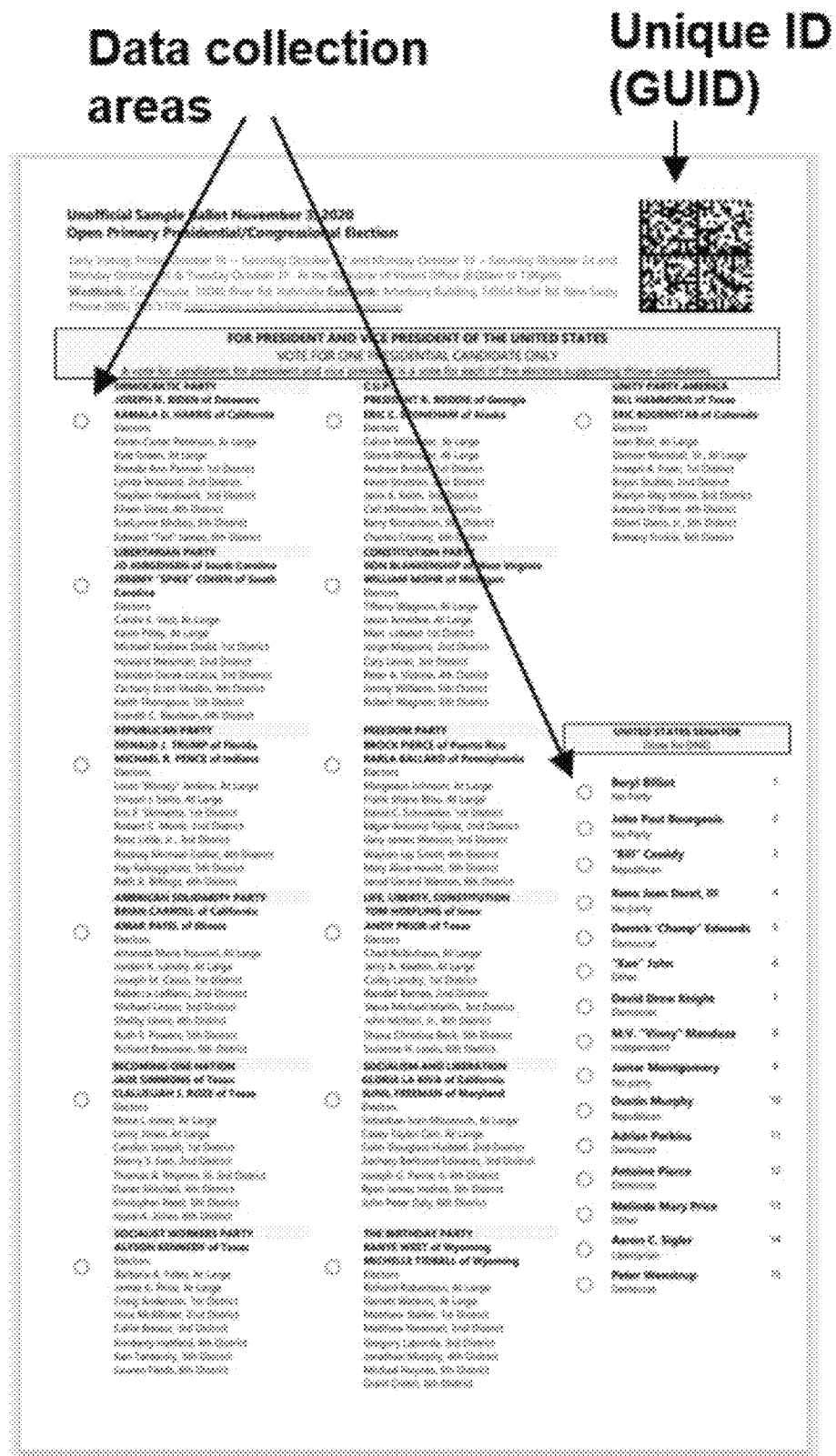
FIG. 9 shows a sample ballot with a 2-D globally unique ID (GUID) added in the lower right corner.

A sample ballot ("the document") is shown in FIG. 9. At the top right corner is a 2-D barcode containing a ballot GUID described below ("the unique identifier"). The barcode also contains the page number and Form ID. The Form ID would be associated with a particular election and district. Numerous variations of the ballot are possible. Optionally, a tear-off portion of the ballot could contain a duplicate copy of the ballot GUID, which could facilitate the ability for a voter to check that their ballot was included in the final result tally and optionally verify that their ballot was interpreted correctly.

5.3.2 What are GUIDs?

The term GUID stands for Globally Unique Identifier. It is analogous to the term UUID for Universal Unique Identifier. Ballot GUIDs are generated in the Remark application and will be stored in the Ballot Master Database when they are printed on a valid ballot. A brief overview of GUID/UUIDs is available on-line at https://en.wikipedia.org/wiki/Universally_unique_identifier Accessed Dec. 23, 2022

5.3.3 What is Secure Paper?

Secure paper contains watermarks or other security features which aid in validating ballot authenticity and in detecting forgeries and tampering. Secure paper may be useful to prevent generation of ballots by unauthorized individuals.

Note that the GUID feature described above also prevents duplication of ballots from going undetected as there are a set number of GUIDs pre-allocated for use on ballots during an election. If an unknown GUID appears or an existing one is used more than once, an investigation may be warranted, especially if a duplicate ballot contains contradictory marks.

The secure paper security features need to be located on the ballot in a manner which does not interfere with the scanning or interpretation of the ballots.

Timely scanning of the ballots makes substitutions more likely to be detected.

5.3.4 Ballot Harvester Protection

Pre-allocation of GUIDs printed on the ballots would make it more difficult for large quantities of fraudulent ballots to be counted in the tallies. Secure paper adds another layer of security that would make it harder for ballot harvesters or an insider to substitute reprinted ballots for cast ballots.

An insider would need some level of access to a store of cast ballots, at the precinct or warehouse, and would need to take a pile of ballots home, reprint them, mark their new preferences, and then substitute them back in at the warehouse. Secure paper would make it obvious if fake ballots were substituted for real ones. Even without secure paper, this action could be detected after the fact if the tallies don't match. The saved ballot images would show the discrepancy in an audit. Ideally, legitimate voters would be able to easily tell that they are using the real paper ballot and not a photocopy or other forgery. Signature validation would also help catch problems with absentee ballots being intercepted and completed by a third party before they are delivered to the proper voter.

5.3.5 Precinct Voter-Facing Scanner Description

Figure 10:
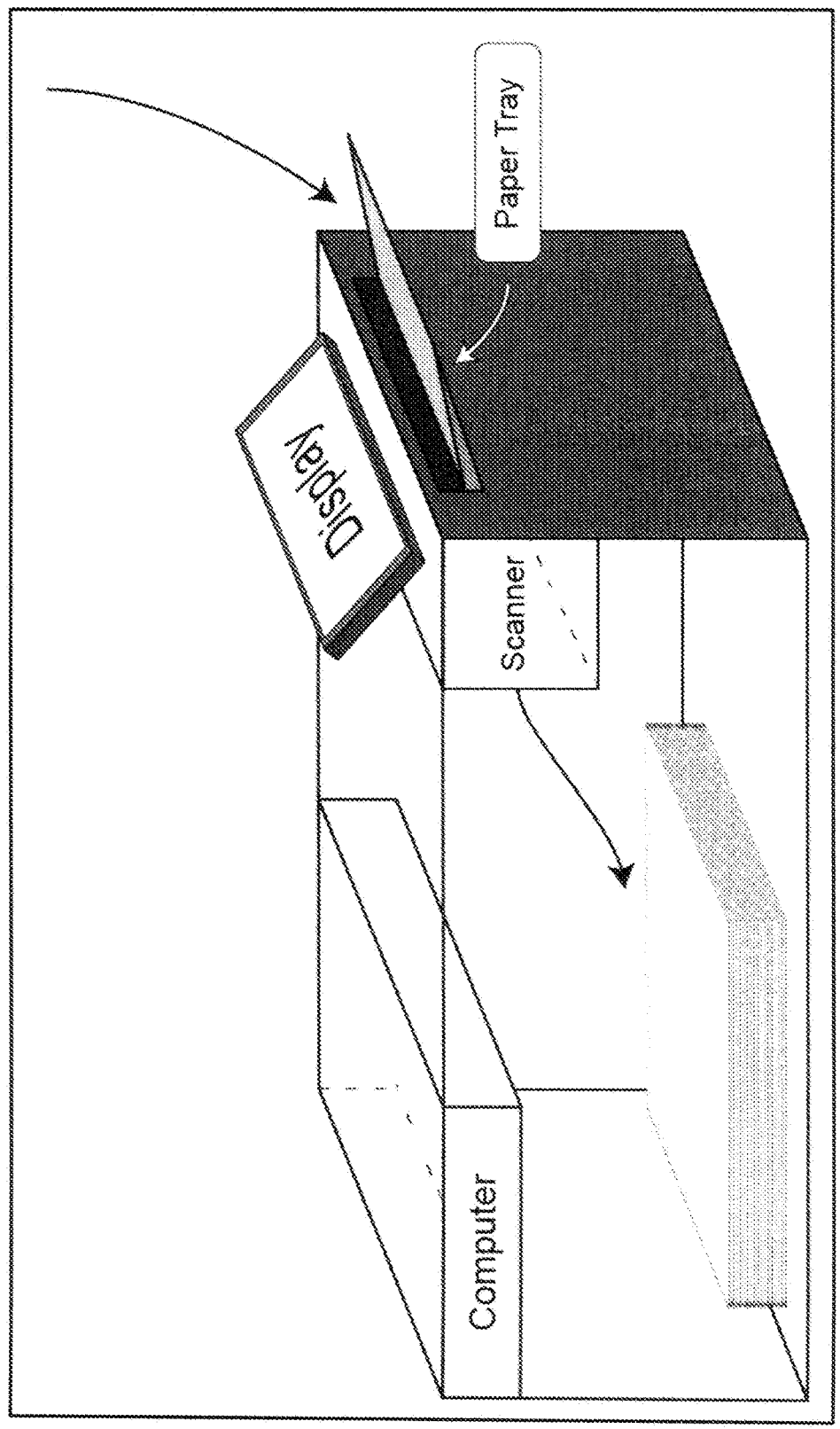
FIG. 10 shows the Precinct Voter-Facing Scanner Components.

A graphic for the components of a Precinct Voter-Facing Scanner is shown in FIG. 10.

The main components are as follows:
A. A secure, durable, and strong housing that has two or more locks protecting access to the central compartment. The keys (or combinations) may be held by separate individuals. The housing will be shielded to reduce or eliminate EMF and optical emissions.
B. At one end of the compartment is a TAA-compliant duplex scanner that is able to scan both sides of a ballot. The scanner can also optionally reverse the page back to the voter if it detects something wrong with the ballot. One example of an adjudication issue with a ballot is voting for too many candidates for a given office, i.e., an overvote.
C. In normal operation, the scanner will output marked ballots to a tray inside of the scanner housing.
D. Contained in the housing is a small isolated computer that will run the Remark Instance software. The computer will be hardened and contain a built-in optical disk writer. No Internet, WiFi, Bluetooth, or other connectivity is available.
E. The computer will display prompts and status to a display mounted on the top of the housing.
F. Tamper-evident seals are located on critical openings and devices.

Most states have thousands of local precincts where voters for local, state and federal elections meet to cast their ballots. Precincts are generally distributed geographically throughout a state to make voting convenient for the electorate. The precinct poll workers are usually drawn from the local population and have various levels of experience.

Figure 11:
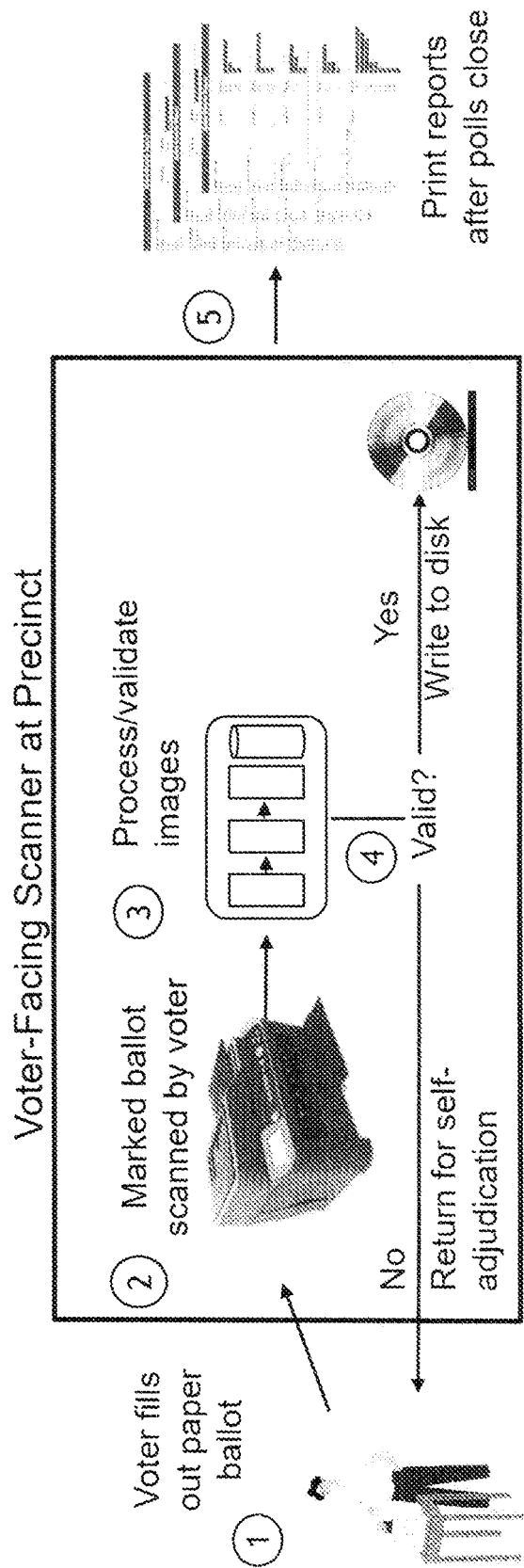
FIG. 11 shows a Voter-Facing Scanner using Remark Office OMR software, available from Gravic, Inc. Malvern, PA USA with manual reporting of results at the Precinct.

The workflow for the Precinct Voter-Facing Scanner ("an optical scanner" which makes "an electronic representation of the document") is shown in FIG. 11 and the steps in the figure are described below.
A. Use of printed paper ballots on paper that is not easy to copy. The paper may have a watermark or other security features that make forgery difficult. See the section above on secure paper.
B. Each ballot is printed at a central location(s) with a "globally unique ID" (GUID) in the form of an alphanumeric string. The string may be printed or placed as a barcode on the ballot. The GUIDs may be kept secret and only disclosed once a packet of ballots is opened from the central printer. Prior to the election, a Ballot Master Database would be created containing all the valid GUIDs for ballots that are to be used in the election.
C. As illustrated in FIG. 11, once the polls open, ballots are hand-marked by voters and the candidate selections are readable by a human (Step 1). The voter then proceeds to the voter-facing scanner and places the ballot in the voter-facing scanner.
D. The scanner scans the marked ballot (Step 2), and sends an image of it to the Remark Office OMR software running on the computer inside the voter-facing scanner.
E. The Remark Office OMR software processes the image of the marked ballot and validates the ballot Step 3).
F. If valid (Step 4), the vote is counted and a time/date stamped image of the ballot is written to the optical disk or other write-once, un-erasable media for forensic and auditing purposes. However, if a problem such as an over or under vote is detected, the voter will be notified and the ballot optionally returned to the voter for self-adjudication.
G. After the polls close, reports are created for the results from that voter-facing scanner (Step 5). The report can be printed, or results can be provided to the poll administrator who can pass it to a central counting location. The tallies may be called or faxed into the central office.
H. Optionally, all blank unused ballots may be scanned after the polls close to prevent their use for fraudulent purposes. The GUIDs of the unused ballots will be recorded as "unused."
I. All precinct scanning equipment is housed in tamper-proof locked containers which collect the scanned ballots. The equipment is shielded to reduce or eliminate all electromagnetic and optical emissions. It is also air-gapped so it operates isolated from outside influences. No connections to the internet, phone system, WiFi networks, nor Bluetooth devices are allowed.

5.3.6 High Data Integrity Back-End Processing

High data integrity for the back-end counting of ballots is accomplished by redundant processing on independent secure systems with validation of the output results on a continuous basis. An overview of the steps is now described.
A. After the final steps in the previous section describing the workflow at the precinct, the polls are closed and tallies of the votes cast are displayed and/or printed.
B. The secure media/optical disk created by each voter-facing scanner is inserted into a system ("document distributor") that has an encrypted channel which is connected to the Processing Centers ("the document processing systems") as described below.
C. The systems send the scanned ballot images to redundant secure servers at two Processing Centers. These servers are referred to as the Voting System Servers (VSS).
D. The two Processing Centers may be housed at separate locations inside of the state where balloting is occurring. Hewlett Packard Enterprise installed and serviced systems for the Processing Center hardware may be used.
E. The two independent Processing Centers each process the ballot images and update its own respective Ballot Master Database ("the associated database")

F. Validation architecture software ensures the integrity of the votes cast in each ballot batch ("the validation engine").

G. All changes to the Ballot Master Databases at the two Processing Centers must match. If any discrepancies are noted, such as duplicative voting or tampering by hackers, the affected data is flagged and the appropriate officials can be contacted ("finalizing the processing").

H. Many types of reports may be run against the Ballot Master Databases. The reports can be immediately compared with the results sent from the precincts. Additionally, it would be possible for public news organizations to obtain a secure data feed from the Ballot Master Database systems.

5.3.7 Back-End Processing Detailed Steps

Figure 12:
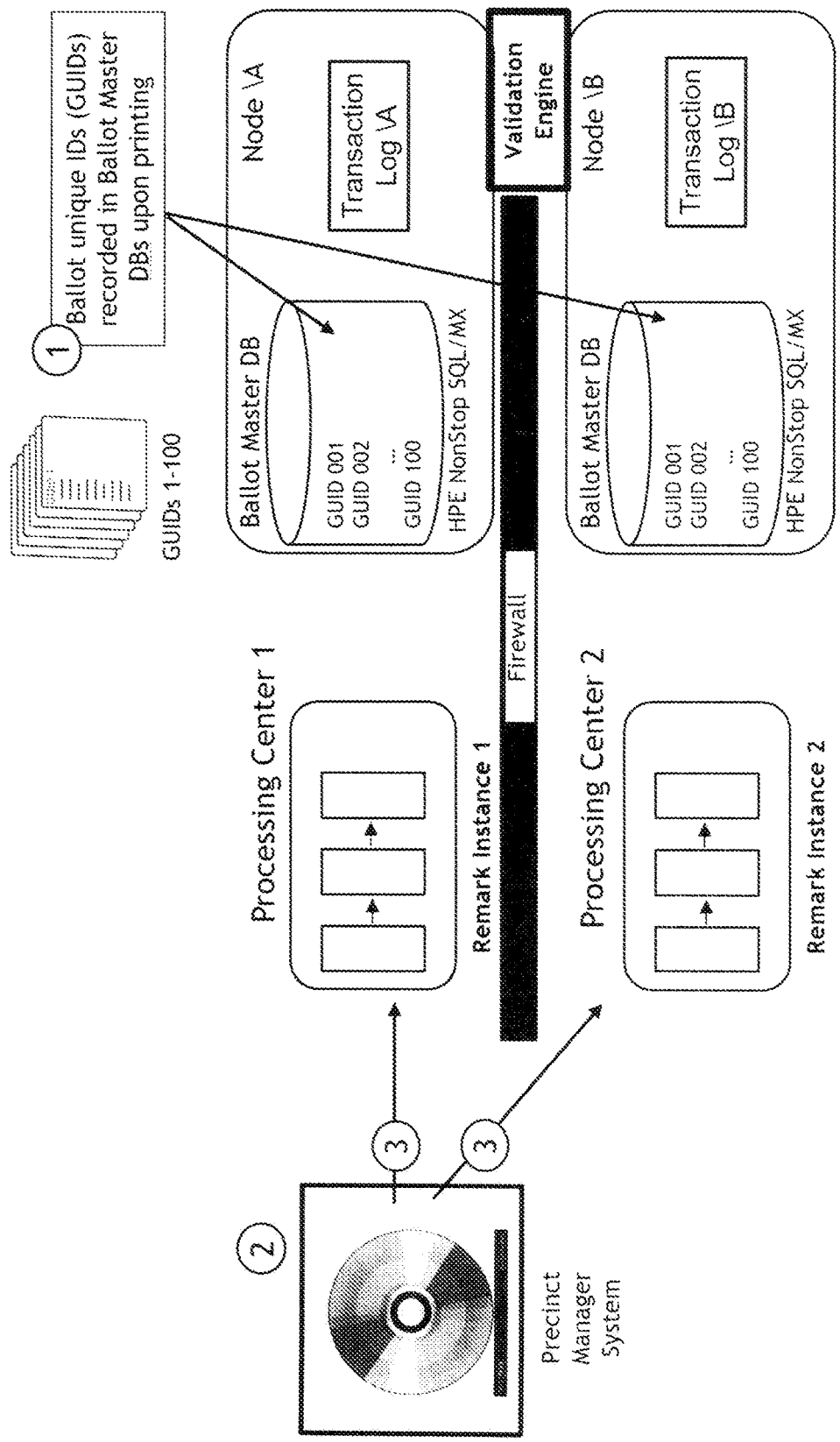
FIG. 12 shows a Voting System embodiment of the present invention: Steps 1-3.

As shown in the POC architecture in FIG. 12, precincts on the left side of the figure are geographically distributed as needed and are used to handle the ballot volume. The detailed redundant back-end processing steps that ensure complete data integrity will now be described.

Step 1. Batches of physical, secure paper ballots are preprinted before the election with unique IDs (GUIDs), which are recorded in both copies of the Ballot Master Database in systems located at independent processing centers.

Step 2. As previously described, ballots are marked by the voters at a precinct, and are submitted for scanning at the voter-facing scanner where the images are saved to secure WORM storage, probably an optical disk.

Step 3. After the polls are closed and voter-facing scanners are shut down, systems at the precincts are connected to encrypted lines. They then send the images of the scanned ballots to two separate Remark processing instances. At the Processing Centers are separate instances of the ballot counting software, Remark Instance 1 and 2, operating on private secure servers. There is an isolating firewall separating the Processing Centers and no uncontrolled method of communication exists between them.

Figure 13:
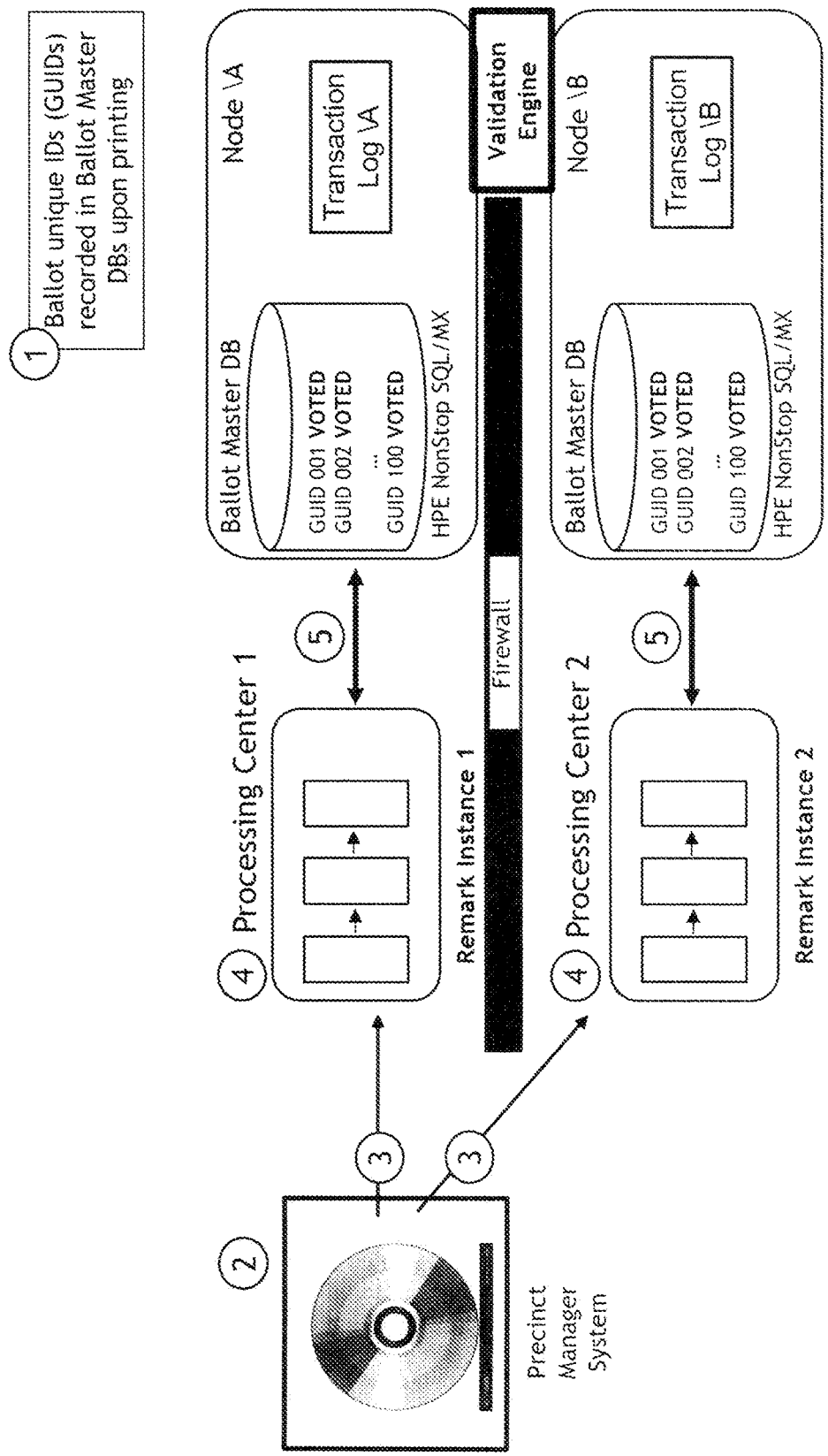
FIG. 13 shows a Voting System embodiment of the present invention: Steps 4-5.

Step 4. As shown in FIG. 13, each Remark Instance processes the ballot images, independently operating on separate networks.

Step 5. The Remark Instances update their respective Ballot Master Database with the ongoing ballot recognition results.

Figure 14:
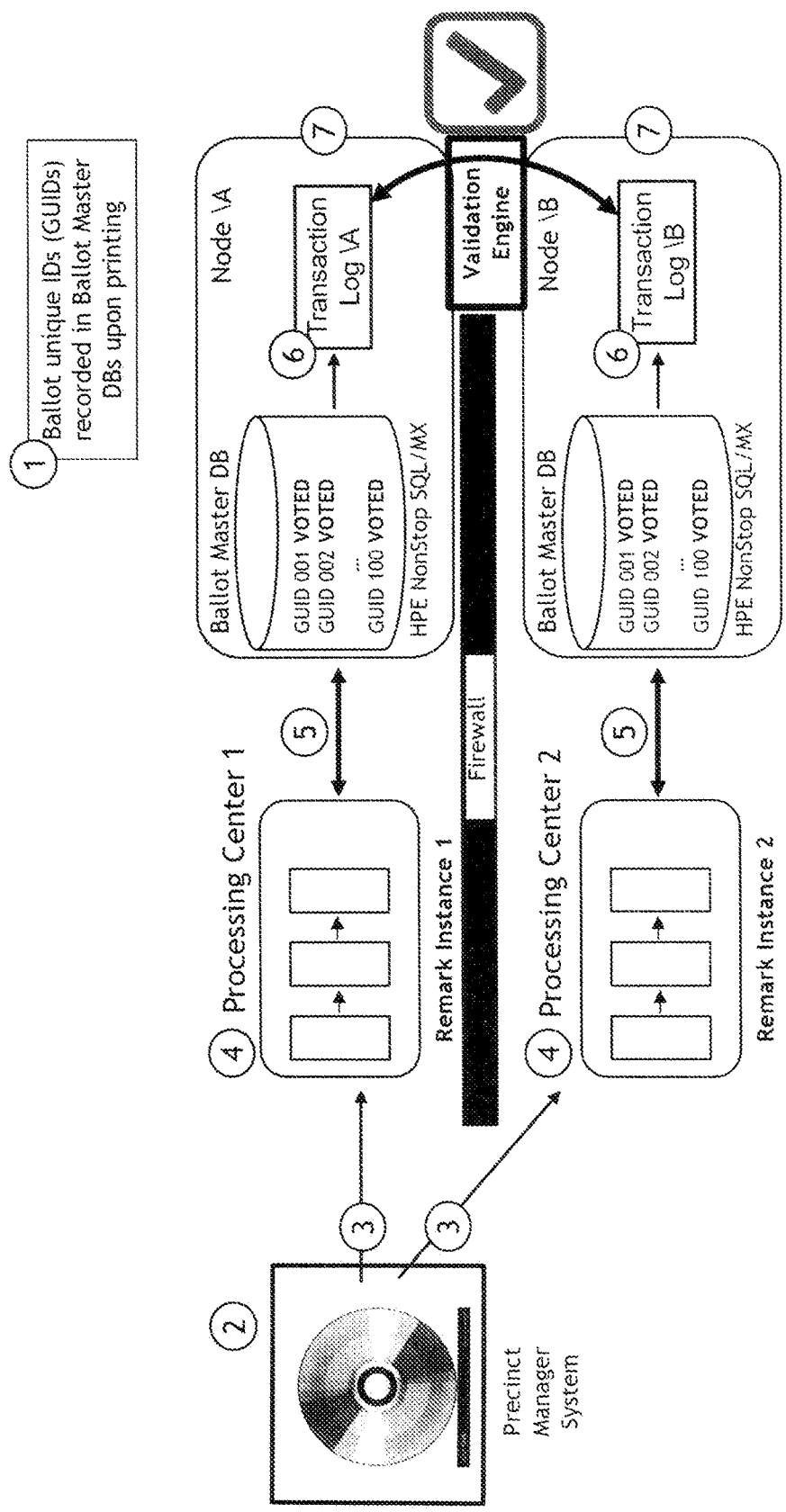
FIG. 14 shows a Voting System embodiment of the present invention: Steps 6-7.

Step 6. As shown in FIG. 14, all changes to the Ballot Master Databases are recorded in durable Transaction Logs. Validation Architecture components implemented with Shadowbase software on each Ballot Master Database node generate a hash value for each transaction batch of ballots and then exchange the value with each other.

Figure 15:
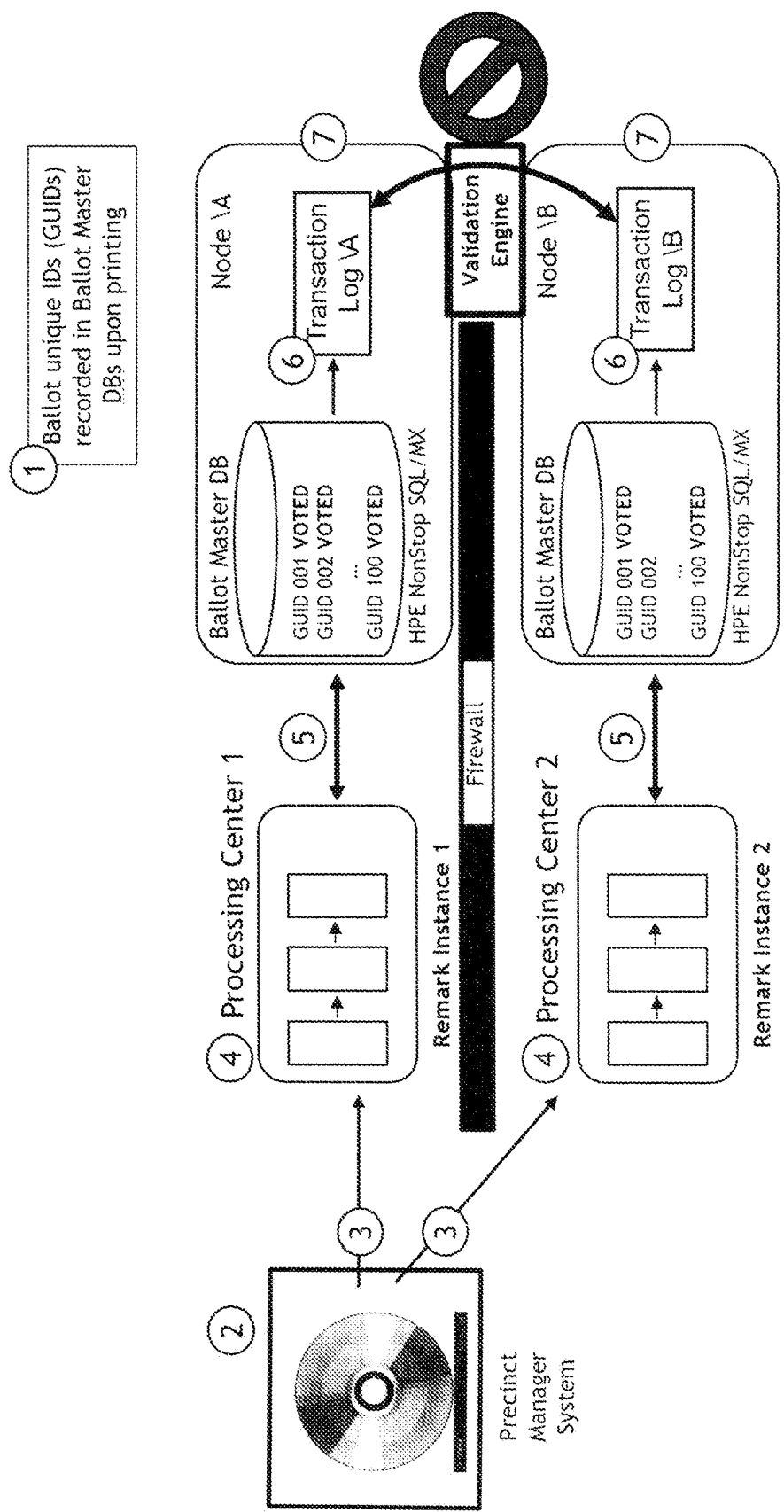
FIG. 15 shows a Voting System embodiment of the present invention when detecting ballot mismatches.

Step 7. If the results match after the comparison, then the results are considered validated in the Ballot Master Database. This step verifies that the Ballot Master Databases are in-sync and that no hardware faults, hackers, insiders, or other threat corrupted the vote tallies. However, if the results do not match, then the mismatch is reported and the ballot batch is marked for further review by appropriate authorities as shown in FIG. 15.

5.3.8 Problems Addressed

No system will ever be perfectly secure as there will always be areas that malicious individuals can attack. This described solution provides the following benefits to reduce the attack surface:

A. Attains a "Balloting Gold Standard" at the local precinct level which uses paper ballots, human marked, and counted locally at the precinct, B. Catches unauthorized ballot copying as the GUIDs are unique. Special security paper used for printing ballots adds another layer of protection, C. Allows for rescanning of ballots with no risk of duplicative counting, D. Prevents hackers from invading a processing stream undetected and changing results, E. Reduces risk from insider attacks if the Processing Centers are each managed by different staff, F. Eliminates the need for election night transport of marked ballots between precincts and the central office, and G. Hackers seeking to change election results are detected before they can cause significant damage.

5.3.9 Key POC Functions and Features

The POC solution is positioned to accomplish the following functions by means of the stated features and enhancements as follows:

A. Utilize human readable and marked paper ballots in the entire election and count them locally.

B. Voters hand mark, then utilize a secure voter facing scanner to count the ballots at the precinct.

C. Eliminate and catch unauthorized ballot duplication.

D. System utilizes paper ballots with globally unique identification codes (GUIDs) which may be printed on special security paper.

E. System software maintains redundant ballot master databases with the outcome of all ballots printed for an election: cast, uncast, and spoiled.

F. Allow for the rescanning of ballots with no risk of duplicative counting.

G. System maintains ballot master databases with software that verifies that ballots are only counted once.

H. System reports on cases where ballot GUIDs are encountered more than once.

I. System alerts officials on instances where the duplicate encounter results in a different cast votes.

J. Detect and prevent hackers, insiders, state actors, eavesdroppers, hardware and software faults, and other issues from affecting the ballot counting process undetected and changing results. Ensure the chain of custody of scanned ballots.

Voting Facing Scanner (VFS)

A. The voter facing scanner is contained in a durable, strong, EMF-emissions protected case with multiple physical keyed locks preventing unauthorized access.

B. The VFS uses a secured operating system running critical scanning software in an isolated hardware/software space. The critical software encompasses the functions of scanning, holding paper while voter self-adjudicates, capturing the ballot to storage, and saving the image and metadata to secure write once (optical) media.

Processing Center Voting System Servers (VSS)

A. VSS software accounts for and processes ballot images from all VFS's used in an election.

B. Utilizes geographically separated servers which independently process the VFS images to count ballots, and utilizes a patented real-time method to compare counting results to quickly identify threats. Reports and/or alerts on any discrepancies detected.

C. Runs on high-integrity servers, in a zero-trust environment, and provides a comprehensive forensic audit trail.
D. Provides business continuity protection from power outages, hurricanes, fires, floods, and sabotage.

Both VFS and VSS

A. Uses multi-factor authentication (MFA), zero-trust principles, locked-down hardware (e.g. no external ports), and tamper-evident controls to prevent unauthorized access.
B. "Data at rest" and "data in motion" is encrypted with industry standard ciphers.
C. Meets or exceeds the LA Act 480 and EAC VVSG 2.0 requirements for Voting Systems.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of processing a document and validating data integrity and reliability of document processing results using (i) a document distributor processor, (ii) a validation engine processor, and (iii) two or more document processing systems, each document processing system having an associated database, the document including (i) one or more data collection areas which are located in and are part of the document and which are configured to receive input by a person who enters information in the one or more data collection areas, and (ii) a unique identifier which is located in and is part of the document, the method comprising:

(a) receiving a document at the document distributor processor;
(b) distributing, by the document distributor processor, an electronic representation of the document to each of the two or more document processing systems, wherein the electronic representation of the document includes an electronic image of the document;
(c) initiating processing of the document received from the document distributor processor in each of the two or more document processing systems by:
  (i) reading the unique identifier of the document from the electronic image of the document,
  (ii) interpreting any inputted information in the one or more data collection areas from the electronic image of the document, and
  (iii) updating the associated database for each of the two or more document processing systems with document processing results including (A) the read unique identifier of the document, and (B) any interpreted inputted information,
wherein processing of the document includes steps (c)(i), (ii), and (iii), and
wherein all of steps (c)(i), (ii), and (iii) occur only after the document distributor processor distributes the electronic representation of the document including the electronic image of the document to each of the two or more document processing systems;
(d) computing a hash value, using a hash function in each of the two or more document processing systems, for each of the document processing results;
(e) matching with each other, in the validation engine processor, the computed hash values for each of the document processing results; and
(f) validating, in the validation engine processor, data integrity and reliability of the document processing results when the computed hash values for each of the document processing results match with each other, wherein the validating means that the document processing results are accepted as valid.

2. The method of claim 1 further comprising:
(g) finalizing the processing of the document in the database of each of the two or more document processing systems when the data integrity and reliability of the document processing results has been validated,
wherein the updating in step (c)(iii) is accomplished as part of a database transaction, and
wherein the finalizing in step (g) includes committing the database transaction.

3. The method of claim 2 wherein the database at each of the document processing systems is prepopulated with the unique identifier, the method further comprising:
(h) prior to finalizing in step (g), checking whether the unique identifier of the document was prepopulated in each of the document processing systems; and
(i) preventing the finalizing of processing of the document in the database of each of the two or more document processing systems when the unique identifier of the document was not prepopulated in each of the document processing systems.

4. The method of claim 2 wherein the database at each of the document processing systems includes a table of unique identifiers of documents that have been previously finalized, the method further comprising:
(h) prior to finalizing in step (g), checking whether the unique identifier of the document was previously finalized in each of the document processing systems; and
(i) preventing the finalizing of processing of the document in the database of each of the two or more document processing systems when the unique identifier of the document was previously finalized in each of the document processing systems.

5. The method of claim 1 further comprising:
(g) finalizing the processing of the document in the database of each of the two or more document processing systems when the data integrity and reliability of the document processing results has been validated,
wherein the updating in step (c)(iii) is performed by writing to a transaction log, and
wherein the finalizing in step (g) includes making the transaction log durable.

6. The method of claim 5 wherein the database at each of the document processing systems is prepopulated with the unique identifier, the method further comprising:
(h) prior to finalizing in step (g), checking whether the unique identifier of the document was prepopulated in each of the document processing systems; and
(i) preventing the finalizing of processing of the document in the database of each of the two or more document processing systems when the unique identifier of the document was not prepopulated in each of the document processing systems.

7. The method of claim 5 wherein the database at each of the document processing systems includes a table of unique identifiers of documents that have been previously finalized, the method further comprising:
(h) prior to finalizing in step (g), checking whether the unique identifier of the document was previously finalized in each of the document processing systems; and
(i) preventing the finalizing of processing of the document in the database of each of the two or more document processing systems when the unique identifier of the document was previously finalized in each of the document processing systems.

8. The method of claim 1 wherein the document received in step (a) is an electronic document.

9. The method of claim 1 wherein the document is a paper document, and wherein the receiving step (a) includes scanning the document.

10. The method of claim 1 wherein the document is a paper document, and wherein the receiving step (a) includes taking a digital picture of the document.

11. The method of claim 1 wherein the unique identifier is added to the document after the document distributor processor receives the document.

12. The method of claim 1 wherein an application adds the unique identifier to the document after the document distributor processor receives the document.

13. The method of claim 1 wherein the unique identifier is in a non-human readable form.

14. The method of claim 1 wherein the hash value is computed using Secure Hash Algorithm (SHA)-2.

15. The method of claim 1 wherein the document is an election ballot.

16. The method of claim 1 wherein the validation engine processor resides on one of the document processing systems, and the hash value computed on another one of the document processing systems is sent via a network to the validation engine processor that resides on the one document processing system for matching and validation thereon.

17. The method of claim 1 wherein the validation engine processor resides on the document distributor processor, and the hash value computed on each of the two or more document processing systems is sent via a network to the validation engine processor that resides on the document distributor processor for matching and validation thereon.

18. The method of claim 1 wherein the validation engine processor resides on an independent system, and the hash value computed on each of the two or more document processing systems is sent via a network to the validation engine processor that resides on the independent system for matching and validation thereon.

19. An apparatus for processing a document and validating data integrity and reliability of document processing results, the document including (i) one or more data collection areas which are located in and are part of the document and which are configured to receive input by a person who enters information in the one or more data collection areas, and (ii) a unique identifier which is located in and is part of the document, the apparatus comprising:
 (a) two or more document processing systems, each document processing system having an associated database;
 (b) a document distributor processor configured to:
  (i) receive a document, and
  (ii) distribute an electronic representation of the document to each of the two or more document processing systems, wherein the electronic representation of the document includes an electronic image of the document;
  wherein the two or more document processing systems are each configured to initiate processing of the document received from the document distributor processor by:
  (i) reading the unique identifier of the document from the electronic image of the document,
  (ii) interpreting any inputted information in the one or more data collection areas from the electronic image of the document, and
  (iii) updating the associated database for each of the two or more document processing systems with document processing results including (A) the read unique identifier of the document, and (B) any interpreted inputted information,
  wherein processing of the document includes the reading, interpreting, and updating steps, and
  wherein all of the reading, interpreting, and updating steps occur only after the document distributor processor distributes the electronic representation of the document including the electronic image of the document to each of the two or more document processing systems;
  wherein the two or more document processing systems are each further configured to use a hash function to compute a hash value for each of the document processing results; and
 (c) a validation engine processor configured to:
  (i) match with each other the computed hash values for each of the document processing results, and
  (ii) validate data integrity and reliability of the document processing results when the computed hash values for each of the document processing results match with each other,
  wherein the validating means that the document processing results are accepted as valid.

20. The apparatus of claim 19 wherein the two or more document processing systems are each further configured to finalize the processing of the document in the database of each of the two or more document processing systems when the data integrity and reliability of the document processing results has been validated, and
 wherein the updating is accomplished as part of a database transaction, and wherein the finalizing includes committing the database transaction.

21. The apparatus of claim 20 wherein the database at each of the document processing systems is prepopulated with the unique identifier, the two or more document processing systems each being further configured to:
 (i) check, prior to the finalizing of the document in the database of each of the two or more document processing systems whether the unique identifier of the document was prepopulated in each of the document processing systems, and
 (ii) prevent the finalizing of processing of the document in the database of each of the two or more document processing systems when the unique identifier of the document was not prepopulated in each of the document processing systems.

22. The apparatus of claim 20 wherein the database at each of the document processing systems includes a table of unique identifiers of documents that have been previously finalized, the two or more document processing systems each being further configured to:
 (i) check, prior to the finalizing of the document in the database of each of the two or more document processing systems whether the unique identifier of the document was previously finalized in each of the document processing systems, and
 (ii) prevent the finalizing of processing of the document in the database of each of the two or more document processing systems when the unique identifier of the document was previously finalized in each of the document processing systems.

23. The apparatus of claim 19 wherein the two or more document processing systems are each further configured to finalize the processing of the document in the database of each of the two or more document processing systems when the data integrity and reliability of the document processing results has been validated, and wherein the updating is performed by writing to a transaction log, and wherein the finalizing includes making the transaction log durable.

24. The apparatus of claim 23 wherein the database at each of the document processing systems is prepopulated with the unique identifier, the two or more document processing systems each being further configured to:
   (i) check, prior to the finalizing of the document in the database of each of the two or more document processing systems whether the unique identifier of the document was prepopulated in each of the document processing systems, and
   (ii) prevent the finalizing of processing of the document in the database of each of the two or more document processing systems when the unique identifier of the document was not prepopulated in each of the document processing systems.

25. The apparatus of claim 23 wherein the database at each of the document processing systems includes a table of unique identifiers of documents that have been previously finalized, the two or more document processing systems each being further configured to:
   (i) check, prior to the finalizing of the document in the database of each of the two or more document processing systems whether the unique identifier of the document was previously finalized in each of the document processing systems, and
   (ii) prevent the finalizing of processing of the document in the database of each of the two or more document processing systems when the unique identifier of the document was previously finalized in each of the document processing systems.

26. The apparatus of claim 19 wherein the document received by the document distributor processor is an electronic document.

27. The apparatus of claim 19 wherein the document is a paper document, and wherein the document distributor processor is configured to scan the document.

28. The apparatus of claim 19 wherein the document is a paper document, and wherein the document distributor processor is configured to take a digital picture of the document.

29. The apparatus of claim 19 wherein the document distributor processor is further configured to:
   (iii) add the unique identifier after the document distributor processor receives the document.

30. The apparatus of claim 19 further comprising:
   (d) an application configured to add a unique identifier after the document distributor processor receives the document.

31. The apparatus of claim 19 wherein the unique identifier is in a non-human readable form.

32. The apparatus of claim 19 wherein the hash value is computed using Secure Hash Algorithm (SHA)-2.

33. The apparatus of claim 19 wherein the document is an election ballot.

34. The apparatus of claim 19 wherein the validation engine processor resides on one of the document processing systems, and the hash value computed on another one of the document processing systems is sent via a network to the validation engine processor that resides on the one document processing system for matching and validation thereon.

35. The apparatus of claim 19 wherein the validation engine processor resides on the document distributor processor, and the hash value computed on each of the two or more document processing systems is sent via a network to the validation engine processor that resides on the document distributor processor for matching and validation thereon.

36. The apparatus of claim 19 wherein the validation engine processor resides on an independent system, and the hash value computed on each of the two or more document processing systems is sent via a network to the validation engine processor that resides on the independent system for matching and validation thereon.

* * * * *